United States Patent [19]
Lewis

[11] 3,881,607
[45] May 6, 1975

[54] TRANSFER APPARATUS
[75] Inventor: Dong Sing Lewis, Toledo, Ohio
[73] Assignee: Gerity-Schultz Corporation, Toledo, Ohio
[22] Filed: Sept. 14, 1973
[21] Appl. No.: 397,398

Related U.S. Application Data
[63] Continuation of Ser. No. 202,208, Nov. 26, 1971, abandoned.

[52] U.S. Cl. ............... 214/1 BC; 198/210; 294/96; 294/110 R
[51] Int. Cl. ............................................. B66c 1/66
[58] Field of Search .......... 214/1 BC, 1 BH; 294/96, 294/110 R, 116; 198/210

[56] References Cited
UNITED STATES PATENTS
2,687,324  8/1954  Grunsky .......................... 294/96
3,124,065  3/1964  Bozek .......................... 214/1 BH X
3,149,714  9/1964  Williams ........................ 294/116 X
3,757,963  9/1973  Binkley .......................... 214/1 BH Primary Examiner—Robert J. Spar
Assistant Examiner—George F. Abraham
Attorney, Agent, or Firm—David H. Wilson

[57] ABSTRACT

A machine having a plurality of spaced apart article supporting members extending generally radially outwadly from an elevatable indexing table for circumferentially transferring the articles to a series of stations by supporting the articles with the indexing table in the elevated position and releasing the articles in the retracted position of the indexing table to facilitate handling and working of the articles at the individual stations.

11 Claims, 11 Drawing Figures

INVENTOR
DONG SING LEWIS

BY
Wilson & Fraser
ATTORNEY

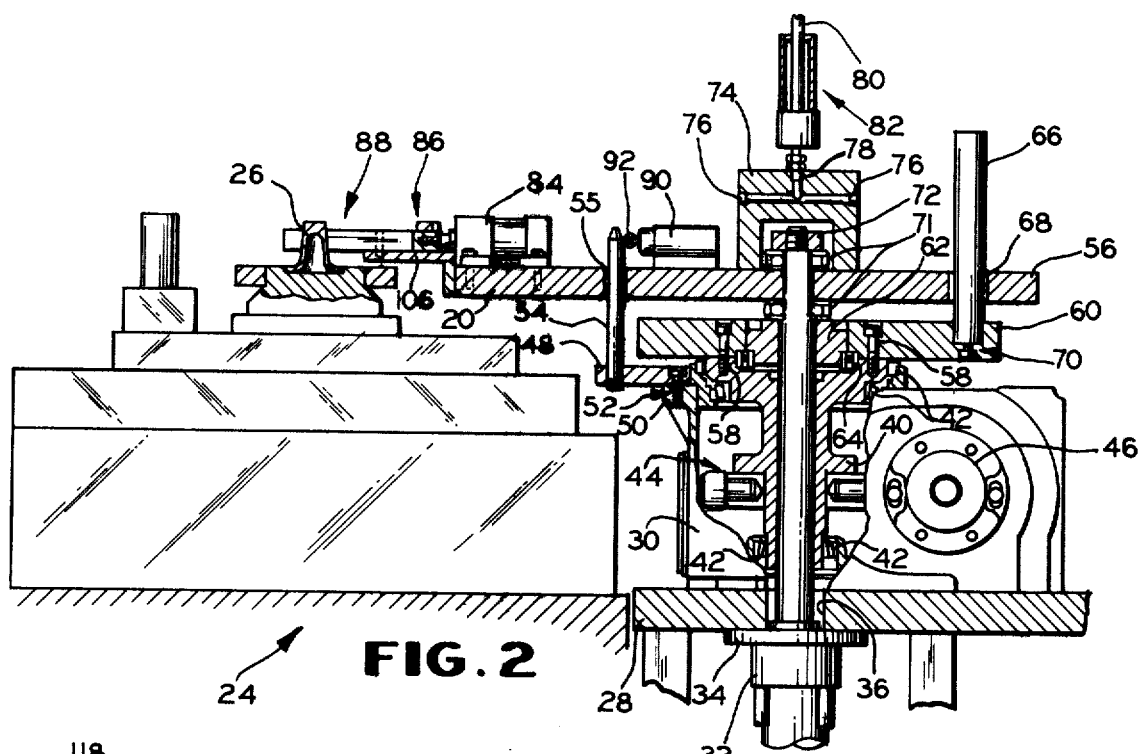
FIG. 2
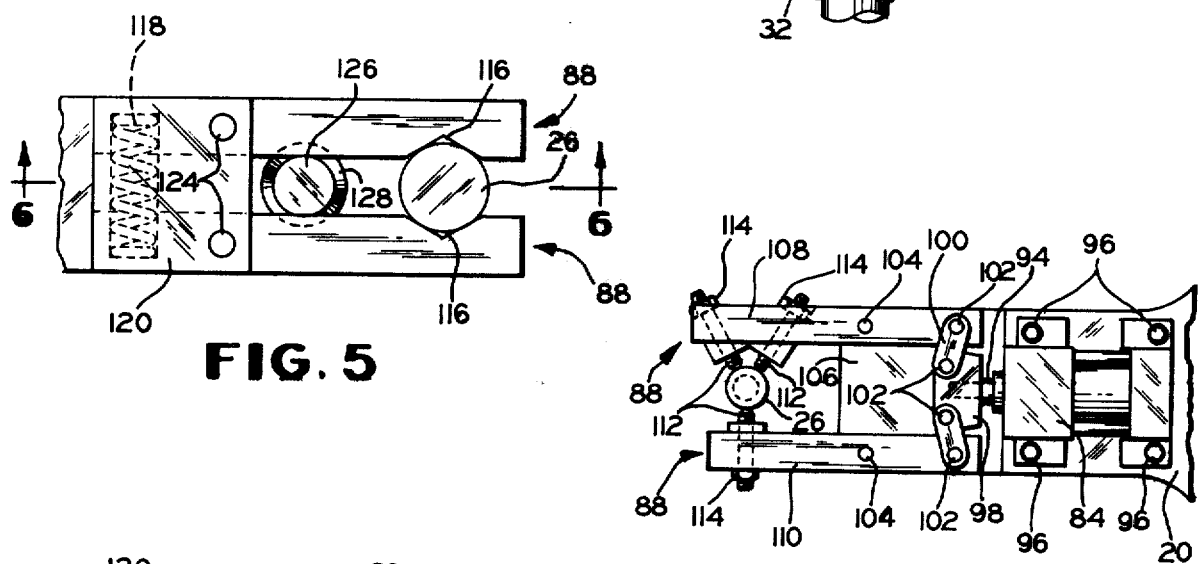
FIG. 5
FIG. 4
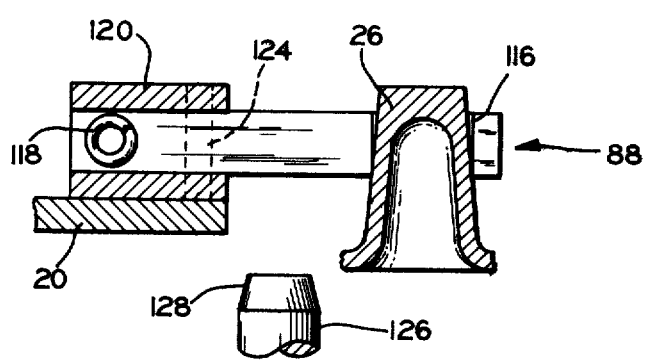
FIG. 6
INVENTOR
DONG SING LEWIS
BY
Wilson + Fraser
ATTORNEY ary application is a continuation of U.S. Pat. application Ser. No. 202,208, filed Nov. 26, 1971, now abandoned.

TRANSFER APPARATUS

CROSS-REFERENCE TO RELATED APPLICATION

This application is a continuation of U.S. Pat. application Ser. No. 202,208, filed Nov. 26, 1971, now abandoned.

BACKGROUND OF THE INVENTION

Heretofore articles such as castings, which required trimming or other machine operations by a press, for example, to remove flashing from a casting, were accomplished by an attendant operating the press placing the article in position within the press. Placing the article within the press required the attendant's hands to be placed within the work area of the press where they could possibly be severed. This type operation becomes particularly hazardous where the press runs continuously and the individual operating it, is required to time his placement of the article between periodically reoccurring work strokes of the press. The same problem occurs upon removal of the article from the press, with the two motions, insertion and removal, generally occurring sequentially between work strokes of the press.

The present apparatus overcomes the requirement of the attendant placing his hands within the press or like type machine by transferring the articles to and from the machine automatically. The apparatus is provided with loading and unloading stations, which are separate from the work station, where an individual may safely place and remove work articles respectively. Further, the apparatus is adapted to multiple station configurations whereby a plurality operation may be accomplished simultaneously upon each index of the apparatus.

SUMMARY OF THE INVENTION

The present invention relates to transfer apparatus and more particularly to machines for transferring objects between work stations wherein the objects may be processed.

In one embodiment of the invention, means for engaging the objects are provided on each of a plurality of transferring arms extending generally radially outwardly from means for rotating the arms, such as an indexing table, to thereby transfer the objects. Means to elevate the indexing table, which may include a pressure fluid motor, is provided to lift the objects at the work stations to clear equipment at the work stations prior to transferring the objects by rotating the indexing table.

The means for engaging the objects to be transferred typically include pressure fluid operated linkage means capable of actuating securing members which grasp the sprue of a casting, for example. Operation of the securing members is interlocked with the indexing table through camming members to release the casting when it is positioned at a station and to grasp the casting when the machine is transferring objects. Further, the transferring arms may also incorporate means for radially extending the securing members, for example, a slide bar mounted on the arm and slidable longitudinally with respect to the arm.

The machine provides a means for transferring objects to and from stations which may contain presses, machining equipment or similar equipment which would present a potentially dangerous situation to an attendant, were he required to manually place the equipment within the station. Combining a number of stations on a single machine with a corresponding number of arms increases efficiency of operation and production of the objects being handled.

BRIEF DESCRIPTION OF THE DRAWINGS

The above objects and advantages of the invention will become readily apparent to one skilled in the art from reading the following detailed description of an embodiment of the invention when considered in the light of the accompanying drawings in which:

FIG. 2 is a fragmentary sectional view of the transfer machine illustrated in FIG. 1 taken along line 2—2 thereof with portions broken away to reveal greater detail;

FIG. 4 is an enlarged fragmentary view of one of the casting engaging portions of the transfer machine in FIG. 1 illustrated in a closed position;

FIG. 5 is a modification of the mechanism illustrated in FIG. 4;

FIG. 6 is a sectional view of the mechanism illustrated in FIG. 5 taken along line 6—6 thereof;

DESCRIPTION OF THE PREFERRED EMBODIMENT

Figure 1:
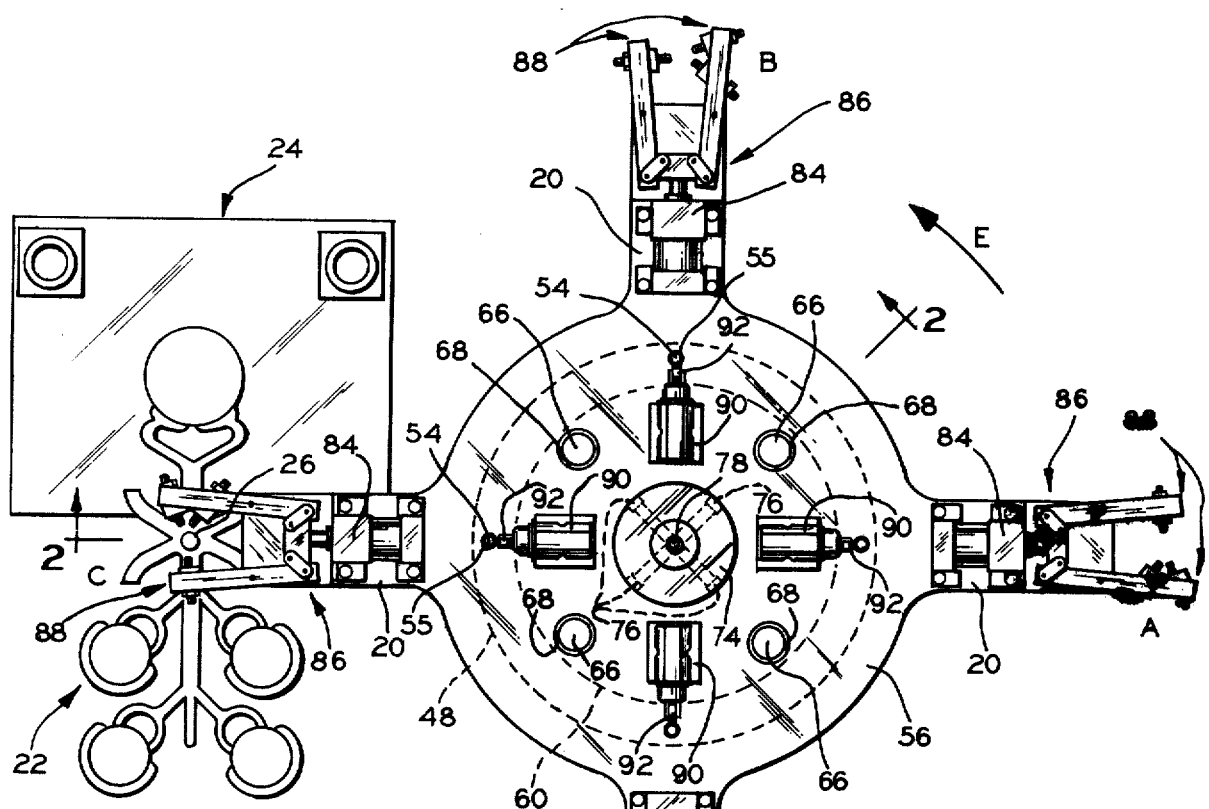
FIG. 1 is a plan view of a transfer machine incorporating the concepts of the invention together with portions of a trimming press and a casting therein, and illustrating the casting engaging portions of the machine in a disengaged position.

Referring to FIGS. 1 and 2, there is illustrated a transfer machine for positioning articles in various stations, designated by the letters A, B, C and D in FIG. 1, wherein an article positioned therein can be loaded, removed, worked on, etc. Any number of stations can be serviced by the machine with an unlimited number of operations available for any one given station. The number of arms 20 extending radially from the machine will be made to correspond to the number of stations. As the machine indexes the arms 20 in the direction indicated by the arrow E, articles are sequentially grasped at one station and advanced to the next station where they may be released. Movement of the arms 20 through 360° of rotation completes a duty cycle of the machine. When the machine is operating continuously, an article is disposed at each station with all stations operating simultaneously. Continuous operation of the machine, therefore, results in a production equal to the number of arms on the machine for each cycle completed. It is an advantage to combine as many operations on the article as possible for use in conjunction with the machine. Thus, the greater the number of stations the greater the efficiency of the machine. Efficiency is also enhanced by combining operations at any one station, for example, the load and unload stations can sometimes be combined into a single station where an attendant removes a finished article and replaces it with an article to be processed.

In the particular embodiment illustrated, a loading station is represented by the letter A where an attendant furnishes an article to the machine, B is a machining station, C is a trimming station and D is an unloading or strip-off station. Station C has a typical object in the form of a casting 22 of the multiple cavity type, illustrated together with a portion of a die press 24 for trimming flashing from the casting 22. A sprue 26 on the casting 22 provides a protuberance for securing the casting 22 for transporting purposes by means for engaging objects provided on the distal ends of the arms 20 of the machine.

The supporting structure and drive mechanism for the machine is clearly illustrated in FIG. 2. A sub plate 28, supported upon a floor engaging support frame (not illustrated), provides support for a drive housing 30 above the sub plate 28 and a fluid actuated cylinder 32 mounted beneath the sub plate 28. The cylinder 32 has a flange 34 by which the cylinder 32 is mounted to the sub plate 28 concentric with an aperture 36 in the sub plate 28 by any conventional means, such as bolting or welding. The aperture 36 provides for passage of a cylinder rod 38 through the sub plate 28. The cylinder rod 38 passes through the base of the drive housing 30 and a driven collar 40 axially coextensive with the cylinder rod 38. The cylinder rod 38 is slidable within the driven collar 40. Located intermediate the driven collar 40 and the drive housing 30 are a series of bearings 42 which support and guide the driven collar 40 which is rotatable with respect to the drive housing 30. Only a portion of the interconnecting drive means 44 is illustrated in the broken away portion of the drive housing 30 because the drive means 44 is a conventional one of the Geneva movement type for imparting intermittent rotational motion to the driven collar 40 from suitable reduction gearing energized by a power source, such as the motor 46, mounted on and integral with the drive housing 30. Other suitable power sources could be used, for example, pneumatically driven motor, and the connection need not be integral with the drive housing 30, but could be connected for example, by a sheave and belt drive as well.

As annular plate 48 is affixed to a flange 50 on the top of the drive housing 30 by threaded fasteners 52. Extending from the annular plate 48 are a plurality of camming members 54, one of which is illustrated in FIG. 2. The camming members pass through suitable apertures 55 in an indexing table 56. The function of the camming member will be described below.

Threaded fasteners 58 countersunk within a rotating table 60 secure the rotating table 60 to the driven collar 40 which supports the rotating table 60. Thus, the driven collar 40 and the rotating table 60 revolve as a single unit. In the center of the rotating table 60 there is a bushing 62 connected thereto by a bearing 64. The bushing 62 maintains the cylinder rod 38 passing therethrough in proper alignment and the bearing 64 permits rotational movement between the bushing 62 and the rotating table 60. A plurality of columns 66, one of which is illustrated in FIG. 2, extend from the rotating table 60 through suitable apertures 68 in the indexing table 56. Threaded fasteners 70 secure the columns 66 to the rotating table 60.

The outer end of the cylinder rod 38 is removably connected to the indexing table 56 by suitable fasteners 71 and a lock nut 72 turned down on a threaded portion of the rod 38. Thus, the indexing table 56 is caused to move with any linear movement of the cylinder rod 38.

A fluid manifold 74 affixed to the top of the indexing table 56 has a plurality of outlets 76 interconnected with an inlet 78 to which a pressure fluid supply line 80 is connected in a manner which permits movement of the manifold 74 in the axial direction of the cylinder rod 38, and rotation of the manifold 74 about the axis of the cylinder rod 38. The above movement of the manifold 74 is provided by a telescoping and rotating sleeve joint 82 which prevents entanglement of the fluid supply line 80.

Figure 3:
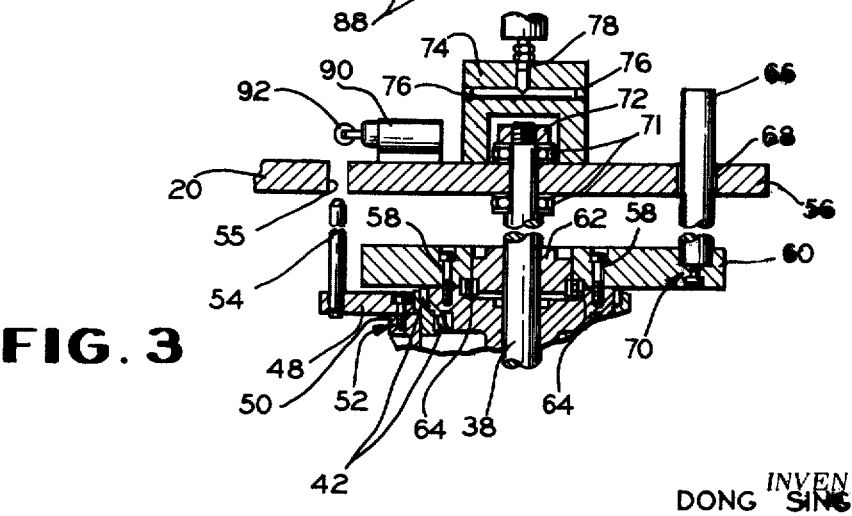
FIG. 3 is a fragmentary sectional view illustrating a portion of the transfer machine in FIG. 2 in an elevated position.

FIG. 3 illustrates the indexing table 56 in an elevated position in which position the table 56 is free to be rotated necessitating the above provisions for movement. Operation of the indexing table requires an interlocking of motions of the cylinder rod 38 and the driven collar 40 because the indexing table 56 must be raised to clear the camming members 54 which extend from the stationary annular plate 48 in order to be free to rotate. The indexing table 56 is elevated by advancing the cylinder rod 38 outwardly from the cylinder 32. Typically, the cylinder 32 is connected by suitable valving, not illustrated, to the pressure fluid supply line 80 whereby the pressure fluid may be directed to extend the cylinder rod 38 raising the indexing table 56 and subsequently directed to retract the cylinder rod 38 lowering the table 56, or alternatively, the pressure fluid may be exhausted from the cylinder 32 to lower the table 56. The columns 66, being attached to the rotating table 60, serve to impart rotation to the indexing table 56 as well as providing guidance of the indexing table 56 in its upward and downward travel. Thus, the rotation of the rotating table 56 by the periodic engagement of the interconnecting drive means 44 causes simultaneous rotation of the indexing table 56, and the motion of the indexing drive is interlocked with that of the cylinder 32 so that rotational motion only occurs when the indexing table 56 is in the raised position.

The amount of rotational travel of the tables 56 and 60 corresponds to the number of arms 20 on the indexing table 56, and the frequency of occurrence of the indexing motion is a function of the operational time required at a given station associated with the machine. In FIG. 1, there are four arms 20 and, therefore, the indexing is in increments of 90° and rotation to advance each arm 20 one station upon each increment of movement of the indexing table 56.

Each arm 20 of the indexing table 56, as illustrated in FIG. 1, has mounted thereon means for engaging the sprue 26 of the casting 22 being processed. The engaging means includes an actuating cylinder 84, interconnecting linkage 86, securing a grasping member 88, and four-way control valves 90 which are disposed intermediate the cylinders 84 and the pressure fluid supply line 80. Suitable conduits, not illustrated, interconnect each of the four-way valves 90 to the outlets 76 on the manifold 74 and to the respective cylinder 84. The four-way valve 90 has a follower 92 which causes the valve 90 to direct pressure fluid to the cylinder 84 to retract the cylinder rod 94 when the follower is engaged and to extend the cylinder rod 94 when the follower 92 is not engaged. In FIGS. 1 and 2, the follower 92 is illustrated as being engaged by the camming member 54 which causes the cylinder rod 94 of each of the cylinders 84 to be retracted. In the retracted position, the securing members 88 are held in an open position as illustrated in FIG. 1. Thus, when the indexing table 56 is in the lowered position, the securing members 88 are maintained in an open, non-engaging position, but as the indexing table is raised, as illustrated in FIG. 3, the follower 92 is disengaged from the camming member 54 causing the securing members 68 to 88 the sprue 26 and lift the casting 22 as the indexing table 56 rises. Since the camming member 54 remains disengaged during all the time when the indexing table 56 is rotated, the casting 22 is carried with the indexing table 56 during its rotation and until the arm 20 reaches the next station. As the indexing table 56 lowers in the new position, the camming member 54 again engages the follower 92 to open the securing members 88 as illustrated in FIG. 1.

As the indexing table 56 lowers, the follower 92 is contacted before the table 56 reaches its bottommost position thereby releasing the casting 22 just prior to the casting 22 reaching its work position in the station. The release of the casting 22 prior to reaching its final position, accommodates any fine adjustment in aligning the casting 22 within the station. Adjustment of the castings 22 may be accomplished by appropriate guides on the work surfaces of the individual stations.

In the above manner, the machine indexes castings placed by an attendant in the load station A and sequentially advances them in 90° steps to a machining station B; a trim station C; and to a strip-off or unloading station D, without the requirement of haulting the casting by an attendant.

In FIG. 4, the means for engaging the sprue 26 on the castings 22 is illustrated in the closed, or engaged, position assumed when the indexing table 56 is in the raised position illustrated in FIG. 3. The cylinder 84 is suitably secured to the arm 20, as for example by threaded fasteners 96. The outer end of the associated cylinder rod 94 is affixed to a block 98 of the linkage 86 which in turn is pivotally connected to one end of a pair of links 100 by suitable pivot pins 102. The other ends of the links 100 are similarly pivotally connected to the securing members 88. A pair of pins 104, one on each securing member 88, pivotally interconnect the securing members 88 to an extension plate 106 affixed to the end of the arm 20. The retraction of the cylinder rod 94 causes the links 100 to pivot toward the cylinder 84 forcing the ends of the securing members 88 attached thereto outwardly from the block 98. The securing members 88 pivot about the pins 104 causing the ends opposite those attached to the links 100 to converge on and grasp the sprue 26 in a secure manner.

The securing members 88 include a pair of bars 108 and 110 one of which is adapted to receive a pair of adjustment screws 112 in threaded apertures therein; and the other is similarly adapted to receive a single adjustment screw 112. The adjustment screws 112 permit fine adjustment for engaging the sprue 26 in a position relative to the arm 20 which corresponds to the proper location of the casting 22 in a given work station. The adjustment screws 112 are provided with locking nuts 114 to lock their positions relative to the bars 108 and 110 subsequent to their adjustment.

FIGS. 5 through 10 illustrate alternate embodiments of the means for engaging the sprue 26. In the embodiment illustrated in FIGS. 5 and 6, the securing members 88 have been simplified with notches 116 to align the sprue relative to the arm 20. A biassing spring 118 resides within recesses 122 in the ends of the securing members 88 and biases them outwardly causing the securing members 88 to pivot about pivot pins 124 which connect the securing members 88 to the mounting block 120. The pivoting of the securing members 88 causes the ends thereof opposite those which are biased to converge thereby enabling the securing means to grasp the sprue 26. As the indexing table 56 is lowered, a shaft 126 having a chamfer 128 thereon engages the securing members 88 and cams them outwardly from each other, thereby effectively releasing the sprue 26. The shaft 126 may be located on the annular plate 48, or more preferably, on the work surface of the stations.

Figure 7:
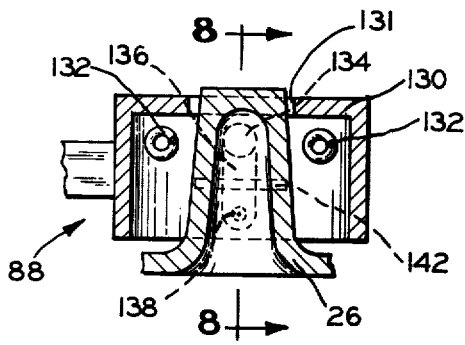
FIG. 7 is a further modification of the mechanism illustrated in FIG. 6.
Figure 8:
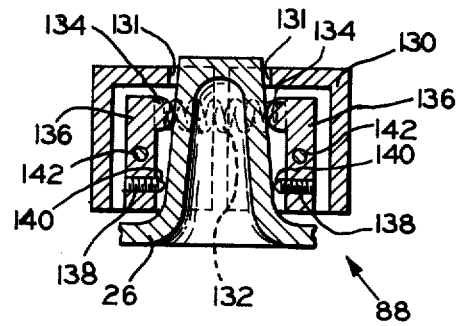
FIG. 8 is a sectional view of the mechanism illustrated in FIG. 7 taken along line 8—8 thereof.

FIGS. 7 and 8 illustrate a further modification of the securing member 88 and employs one-half of a split cylindrical collar 130 having an opening 131 in the top for passage of the sprue 26. The two halves of the collar 130 are biased towards each other by a pair of cooperating springs 132 so that ears 134 on a pair of pivot bars 136 are forced outwardly upon engagement with the sprue 26. A pair of adjustable screws 138 having pointed tips 140 are threaded into apertures in the pivot bars 136 on opposite sides of a pivot pin 142 from the ears 134. Movement of the ears 134 outwardly causes the pointed tips 140 of the adjustable screws 138 to converge and embed in the surface of the sprue 26, thereby securing the sprue to the securing member 88.

Figure 9:
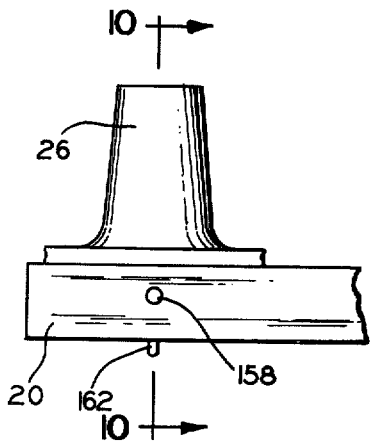
FIG. 9 is an elevational view of another modification of the mechanism illustrated in FIG. 4.
Figure 10:
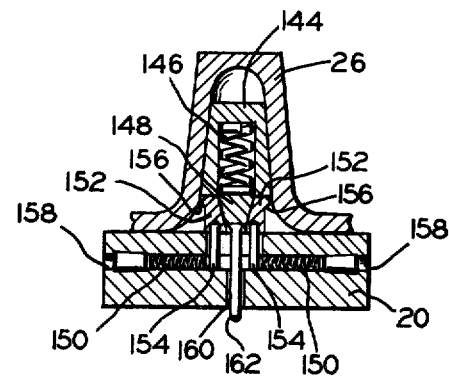
FIG. 10 is a sectional view of the mechanism illustrated in FIG. 9 taken along line 10—10 thereof.

In FIGS. 9 and 10 the arm 20 is illustrated with a fixture mounted on top of it for insertion into the interior of the sprue 26. The fixture includes a spring housing 144 supported by a spring 146 resting on a wedge 148. The spring housing 144 has side walls, the outer surfaces of which generally conform to the configuration of the inside of the sprue 26. When the sprue 26 drops over the housing 144, the housing 144 is forced downward and compresses the spring 146. The force exerted by the compressed spring 146 is sufficient to overcome the bias of a pair of springs 150. The spring pressure is applied to the sliding elements 152 through a pair of interconnecting pins 154. The spring 146, therefore, forces the wedge 148 downwardly which forces the sliding elements 152 outwardly toward the sprue 26 to embed points 156 thereon within the interior surfaces of the sprue 26. The sliding elements 152 by embedding of the points 156 are able to secure the sprue 26 upon the housing 144. The conformity of the housing 144 to the shape of the sprue 26 assures proper alignment of the sprue with respect to the arm 20 and, therefore, the work stations. The arms 20 is provided with recesses 158 and 160 for receiving the springs 150 and a release pin 162, respectively. The release pin 162 is affixed to the wedge 148 and extends out of the recess 160 when the wedge 148 is in the downward position for securing the sprue 26. When the release pin 162 is forced upwardly into the recess 160, as, for example, when the arm 20 is lowered with the indexing table 56 of FIG. 2 to engage the release pin 162 with the working surface of a station, the wedge 148 moves upwardly against the bias of the spring 146 permitting the sliding elements 152 to converge toward each other under the bias of the springs 150 and thereby release the sprue 26.

Figure 11:
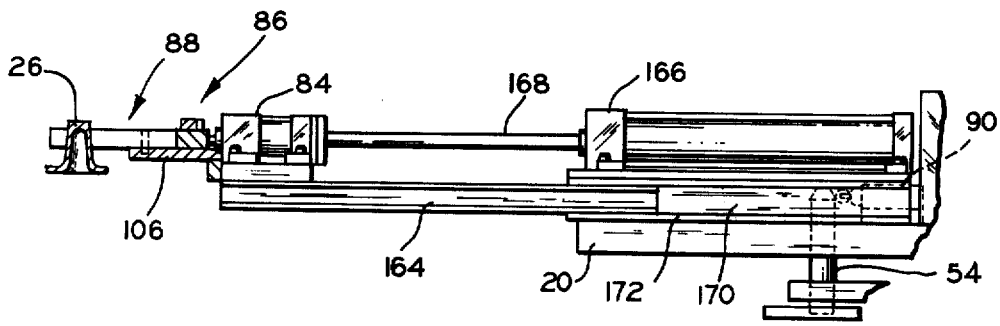
FIG. 11 is a modification of the transfer machine illustrated in FIG. 1 including means for radially extending the casting engaging portions thereof.

FIG. 11 illustrates an embodiment of the invention wherein arms 20 are provided with radially extending members. The embodiment illustrated in FIG. 11 includes a slide bar 164 intermediate the arms 20 and the cylinder 84 on which the cylinder 84 and securing members 88 are mounted. The slide bar 164 is mounted within a groove 170 in a beam 172 on the arm 20 to slide longitudinally relative to the arm 20. A pressure fluid cylinder 166 is mounted on the beam 172 and has a cylinder rod 168 affixed to the slide bar 164 through connection to the cylinder 84 mounted thereon so that when pressure fluid from the pressure fluid supply line 80 is directed by conduits and valving, not illustrated, to appropriate ports on the cylinder 166, the cylinder rod 168 may be extended and retracted to thereby extend and retract the slide bar 164. In the above manner, the securing members 88 supporting the sprue 26 may be retracted radially prior to rotation of the indexing table 56 and subsequently extended to position the casting 22 within a station when the arm 20 has been aligned in front of the station. The ability to retract the slide bar 164 accommodates stations which do not have the necessary clearance to permit the swinging of the arm 20 and the associated securing members 88 on an arcuate path. The movement or actuation of the cylinder rod 168 and the slide bar 164 are interlocked or synchronized with those of the indexing table 56 to assure that the slide bar 164 is always retracted before the indexing table 56 is rotated.

The apparatus described herein before is capable of supplying castings or similar objects to a plurality of work stations wherein the objects may be processed without being handled by an attendant. Where an attendant is required to load or unload the machine, the activity is accomplished at a station or stations free of associated machinery, such as presses, thereby eliminating the requirement of an attendant placing his hands or arms within the machines whereby the attendant could be seriously injured. The machine can accommodate a plurality of stations wherein objects can be processed simultaneously to increase efficiency of operation and productivity of the objects being processed.

In accordance with the provisions of the patent statutes, the principle and mode of operation of the machine have been explained and what is considered to represent its best embodiment, has been illustrated and described. It should, however, be understood that the invention may be practiced otherwise than as specifically illustrated and described without departing from its spirit or scope.

What I claim is:

1. Apparatus for transferring objects between stations comprising: a plurality of equally spaced radially extending arms, an indexing table interconnecting said arms within a common plane and having at least one aperture formed therein, a rotating table, means for rotating said rotating table, column means attached to said rotating table and extending through said aperture in said indexing table for interconnecting said rotating table and said indexing table to impart simultaneous unidirectional rotational motion thereto and to permit relative movement between said tables in a direction normal to the axis of rotation thereof, means for elevating said indexing table extending through said rotating means, rotation preventing means coacting with said index table and arranged so as to permit rotation of said indexing table only in the elevated position, means for engaging the objects connected to said arms for supporting the objects during transfer between stations, and means positioned in the path of movement of said means for engaging the objects to control the means for engaging the objects so that they are engaged at all times when said elevating means is raised and released when said elevating means is lowered.

2. Apparatus in accordance with claim 1 wherein said means for elevating said indexing means includes a pressure fluid cylinder.

3. Apparatus in accordance with claim 1 wherein said means for engaging the objects includes securing members for engaging the object, means for energizing said securing members and interconnecting linkage between said securing members and said means for energizing.

4. Apparatus in accordance with claim 1 wherein said means for engaging the objects includes securing members, means for biassing said securing members to cause said members to converge toward each other, and means for selectively engaging said securing members to part said members against the force of said biassing means.

5. Apparatus in accordance with claim 4 wherein each of said securing members includes a half of a collar, opposing pivot members on each of said collar halves, ears and points on said pivot members and wherein said means for biassing is attached to said collar halves to urge said halves toward each other, said ears contacting the object upon said collar being placed over a portion thereof causing said pivot members to pivot and thereby converge said points toward each other to embed in the object.

6. Apparatus in accordance with claim 1 wherein said means for engaging the objects includes sliding elements slidable with respect to said arm for engaging the interior of the objects and in opposing relationship to each other, means biassing said elements towards each other, means for moving said elements outwardly from each other toward the object in opposition to said biassing means, said means for moving being engageable by the object, and means for releasing said means for moving said elements to disengage said elements from the object.

7. Apparatus in accordance with claim 6 wherein said means biassing said elements includes a spring.

8. Apparatus in accordance with claim 6 wherein said means for moving said elements outwardly from each other includes a wedge slidable between said elements, a housing engageable with the object, and a spring interconnecting said housing with said wedge forcing said wedge between said elements when the object engages said housing to energize said spring.

9. Apparatus in accordance with claim 6 wherein said means for releasing said means for moving said elements includes a release pin affixed to said means for moving said elements.

10. Apparatus in accordance with claim 1 including means for radially extending said means for engaging the objects intermediate said arms and said engaging means.

11. Apparatus in accordance with claim 10 wherein said means for radially extending said means for engaging the objects includes a slide bar mounted on said arm and capable of longitudinal movement relative to said arm, and means for moving said slide bar relative to said arm.

* * * * *